US011854353B2

(12) United States Patent
Lee (10) Patent No.: US 11,854,353 B2
(45) Date of Patent: Dec. 26, 2023

(54) HEIGHT-ADJUSTABLE KIOSK APPARATUS

(71) Applicant: HANASIS CO., LTD., Gyeonggi-do (KR)

(72) Inventor: Jung Yong Lee, Gyeonggi-do (KR)

(73) Assignee: HANASIS CO., LTD., Yongin-si (KR)

( * ) Notice: Subject to any disclaimer, the term of this patent is extended or adjusted under 35 U.S.C. 154(b) by 0 days.

(21) Appl. No.: 17/991,023

(22) Filed: Nov. 21, 2022

(65) Prior Publication Data

US 2023/0316877 A1 Oct. 5, 2023

(30) Foreign Application Priority Data

Apr. 5, 2022 (KR) .......................... 10-2022-0042219

(51) Int. Cl.
*G07G 1/00* (2006.01)
*G10L 17/22* (2013.01)
*G06V 40/16* (2022.01)

(52) U.S. Cl.
CPC ......... *G07G 1/0018* (2013.01); *G06V 40/165* (2022.01); *G06V 40/171* (2022.01); *G10L 17/22* (2013.01)

(58) Field of Classification Search
CPC .. G07G 1/0018; G06V 40/171; G06V 40/165; G10L 17/22
USPC ........................................................ 235/383
See application file for complete search history.

(56) References Cited

U.S. PATENT DOCUMENTS

| 6,584,375 | B2 * | 6/2003 | Bancroft | G07F 9/001 |
| | | | | 235/383 |
| 2013/0215275 | A1 * | 8/2013 | Berini | G06V 10/993 |
| | | | | 348/150 |
| 2017/0228674 | A1 * | 8/2017 | Budde | G06Q 10/0635 |
| 2021/0342051 | A1 * | 11/2021 | Kapinos | G06F 1/16 |
| 2022/0163995 | A1 * | 5/2022 | Rodriguez | H04W 4/02 |

FOREIGN PATENT DOCUMENTS

| KR | 1020170070412 A | 6/2017 |
| KR | 102273794 B1 | 7/2021 |
| KR | 102296271 B1 | 9/2021 |
| KR | 20210141234 A | 11/2021 |
| KR | 20210150028 A | 12/2021 |

* cited by examiner

*Primary Examiner* — Daniel A Hess
(74) *Attorney, Agent, or Firm* — Bridgeway IP Law Group, PLLC; Jihun Kim (57) ABSTRACT

A height-adjustable kiosk apparatus includes: a kiosk unit configured to generate processed signals by recognizing and processing an image and a voice, to receive basic signals from a user, to perform output, and to process payment; and a height adjustment unit disposed under the kiosk unit, and equipped with a driving unit configured to be driven to move the kiosk unit up and down based on the processed signals; wherein the kiosk unit includes an image recognition unit, a voice recognition unit, an image processing unit, and a voice processing unit; and wherein the height adjustment unit includes a driving signal generation unit and a priority determination unit.

12 Claims, 6 Drawing Sheets

HEIGHT-ADJUSTABLE KIOSK APPARATUS

CROSS-REFERENCE TO RELATED APPLICATION

This application claims the benefit of Korean Patent Application No. 10-2022-0042219 filed on Apr. 5, 2022, which is hereby incorporated by reference herein in its entirety.

BACKGROUND

1. Technical Field

The present disclosure relates to a height-adjustable kiosk apparatus capable of primarily performing height adjustment on a per-section basis and secondarily performing fine height adjustment.

2. Description of the Related Art

Recently, contactless technology is developing from day to day in order to meet the need for selling products without operating personnel or in an unmanned manner and to deal with product sales or complaints in non-face-to-face situations due to COVID-19. In particular, the demand for kiosks, i.e., unmanned input/output devices or unmanned vending machines, which are representative products mainly used for contactless technology, is increasing.

In particular, various types of kiosks are generally used in places spanning from shopping malls selling products or tickets to government offices handling various civil affairs tasks. In fact, according to BCC Research, i.e., a US market research company, it can be confirmed that the kiosk market has significantly increased to $1.72 million in U.S. currency or about KRW 19.57 trillion in Korean currency as of 2020. In Korea, the kiosk market grew from KRW 60 billion in 2006 to KRW 250 billion in 2017, recording an average annual growth rate of 13.9%.

In addition, as interest in contactless technology has increased due to the impact of COVID-19 that occurred in 2020, major domestic government offices are also deploying kiosks. Furthermore, the introduction of kiosks, which were used only in large franchise shops, e.g., fast food restaurants and movie theaters, is gradually expanding to small and medium-sized shopping malls.

In most of such kiosks, display units are installed at the average height of adult bodies so that normal adult men and women can use them. Due to this, the display units of kiosks are not reachable by persons lower than the average height of adult bodies such as wheelchair users, children, and the elderly, and also they are installed to be higher than the levels of users' eyes, so that the use of the kiosks is limited.

In addition, there is a case where a separate kiosk having a low height is installed, in which case both manufacturers and consumers are reluctant to introduce it because it is necessary to pay an additional cost for the construction of a separate enclosure suitable for the kiosk for the disabled and also there is a difficulty of expanding a lineup because the height of each product is fixed.

The prior art literature for conventional height-adjustable kiosk apparatuses is Korean Patent Application No. 10-2015-0177883.

Conventional simple kiosk apparatuses that automatically control the height thereof according to the height of a user's face or eyeballs have the following problems.

As the height of a kiosk apparatus is simply automatically adjusted according to the height of a user's face or eyeballs, the height of the user is not recognized correctly or the height of the kiosk apparatus cannot be adjusted appropriately according to the user's individual body, so that there is a problem in that it has to be used in an uncomfortable state compared to existing kiosk apparatuses. When an image sensor with many errors is used, there are frequent cases where the height adjustment of the kiosk apparatus fails and it is often impossible to adjust the kiosk apparatus to a height desired by a user.

In addition, when a user simply manually adjusts the height of the kiosk apparatus, time is consumed to adjust the height of the kiosk apparatus, so that there is a problem in that the user cannot make use of the essence of the kiosk apparatus used for rapid ordering or payment.

SUMMARY

An object of the present disclosure is to provide a kiosk apparatus capable of performing height adjustment in a two-track fashion in order to solve the above problems.

According to an aspect of the present disclosure, there is provided a height-adjustable kiosk apparatus, including: a kiosk unit configured to generate processed signals by recognizing and processing an image and a voice, to receive basic signals from a user, to perform output, and to process payment; and a height adjustment unit disposed under the kiosk unit, and equipped with a driving unit configured to be driven to move the kiosk unit up and down based on the processed signals; wherein the kiosk unit includes: an image recognition unit configured to detect a user and to extract an image of the user; a voice recognition unit configured to extract a voice of the user; an image processing unit configured to calculate a measured height value by converting the image extracted by the image recognition unit, to determine a determined matched section by comparing previously stored section values with the measured height value, and to calculate a first signal; and a voice processing unit configured to convert the voice, extracted by the voice recognition unit, into a voice signal, to match the voice signal with a previously stored voice, and to calculate a second signal when the similarity between the voice signal and the stored voice satisfies a set reference value or higher; and wherein the height adjustment unit includes: a driving signal generation unit configured to, when the first signal is calculated, calculate a first driving signal used for the driving unit to drive the kiosk unit to a height value set for the determined matched section, and to, when the second signal is calculated, calculate a second driving signal used for the driving unit to drive the kiosk unit according to an operation set in the voice signal; and a priority determination unit configured to, when the driving signal generation unit receives the first signal and the second signal, perform control so that the first driving signal is preferentially generated for the first signal.

The image processing unit may include: a coordinate detection unit configured to detect three-dimensional coordinates for the center of both eyes of the user from the image extracted by the image recognition unit; a coordinate conversion unit configured to determine final coordinate values by converting the coordinates, detected by the coordinate detection unit, into physical coordinate values and then correcting the physical coordinate values; a height calculation unit configured to calculate the measured height value based on the final coordinate values; a section storage unit configured to store a plurality of section values for respective predetermined height sections; a section matching unit configured to determine a determined matched section when the measured height value is included in a corresponding one of the section values; and a first signal generation unit configured to calculate the first signal including the height value of the determined matched section.

The voice processing unit may include: a location determination unit configured to determine the location information of the kiosk unit; a voice conversion unit configured to convert the voice, extracted by the voice recognition unit, into the voice signal including a digital signal; a voice storage unit configured to store language information set for each region determined by the location determination unit; a voice matching unit configured to compare the language information stored in the voice storage unit with the voice signal obtained through the conversion by the voice conversion unit, and to perform matching when the similarity therebetween satisfies the set reference value or higher; and a second signal generation unit configured to, when the voice signal and the language information are matched with each other, generate the second signal including an operation signal according to the matched language information.

The height adjustment unit may further include a priority determination unit configured to, when the first signal and the second signal are simultaneously received, determine priority so that the first driving signal can be generated in preference to the second driving signal by transmitting the first signal to the driving signal generation unit in preference to the second signal.

The kiosk unit may further include an input/output unit configured to output an operating state to the outside when the driving unit performs one of the first and second operations.

BRIEF DESCRIPTION OF THE DRAWINGS

The above and other objects, features, and advantages of the present disclosure will be more clearly understood from the following detailed description taken in conjunction with the accompanying drawings, in which.

DETAILED DESCRIPTION

Embodiments of the present disclosure will be described in detail below with reference to the accompanying drawings so that those of ordinary skill in the art to which the present disclosure pertains can easily practice the present disclosure. The present disclosure may be embodied in many different forms and is not limited to the structures or methods described herein.

Although a configuration including a function for making payments with a kiosk apparatus that can be utilized for product sales or document issuance will be described as an example in the embodiments of the present disclosure, the present disclosure may be used even in the case of a kiosk apparatus that does not provide a payment function. Hereinafter, such an apparatus will be briefly referred to as a "kiosk apparatus."

Figure 1:
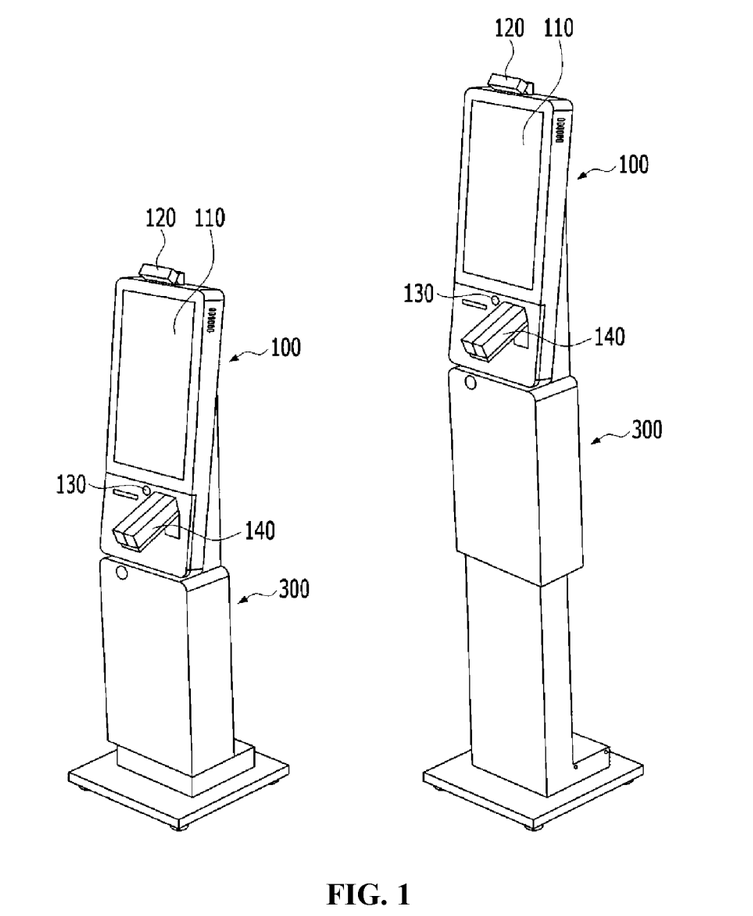
FIG. 1 is a comparative perspective view of an operating state of a height-adjustable kiosk apparatus according to an embodiment of the present disclosure.
Figure 2:
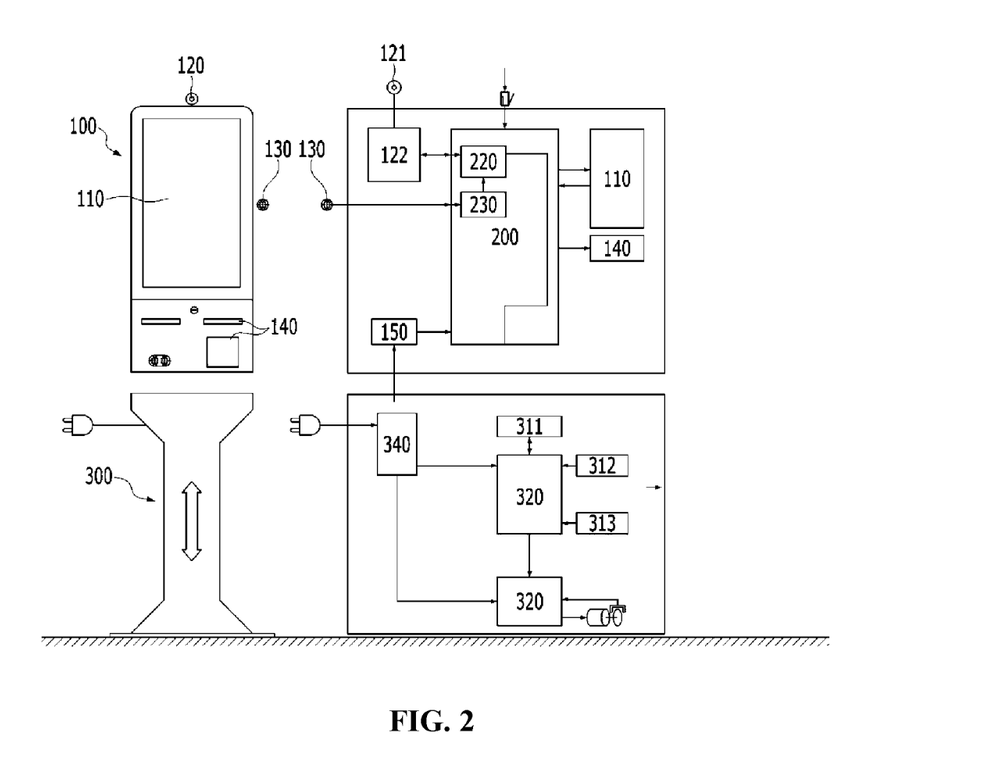
FIG. 2 is a view showing the configuration of the height-adjustable kiosk apparatus according to the embodiment of the present disclosure.
Figure 3:
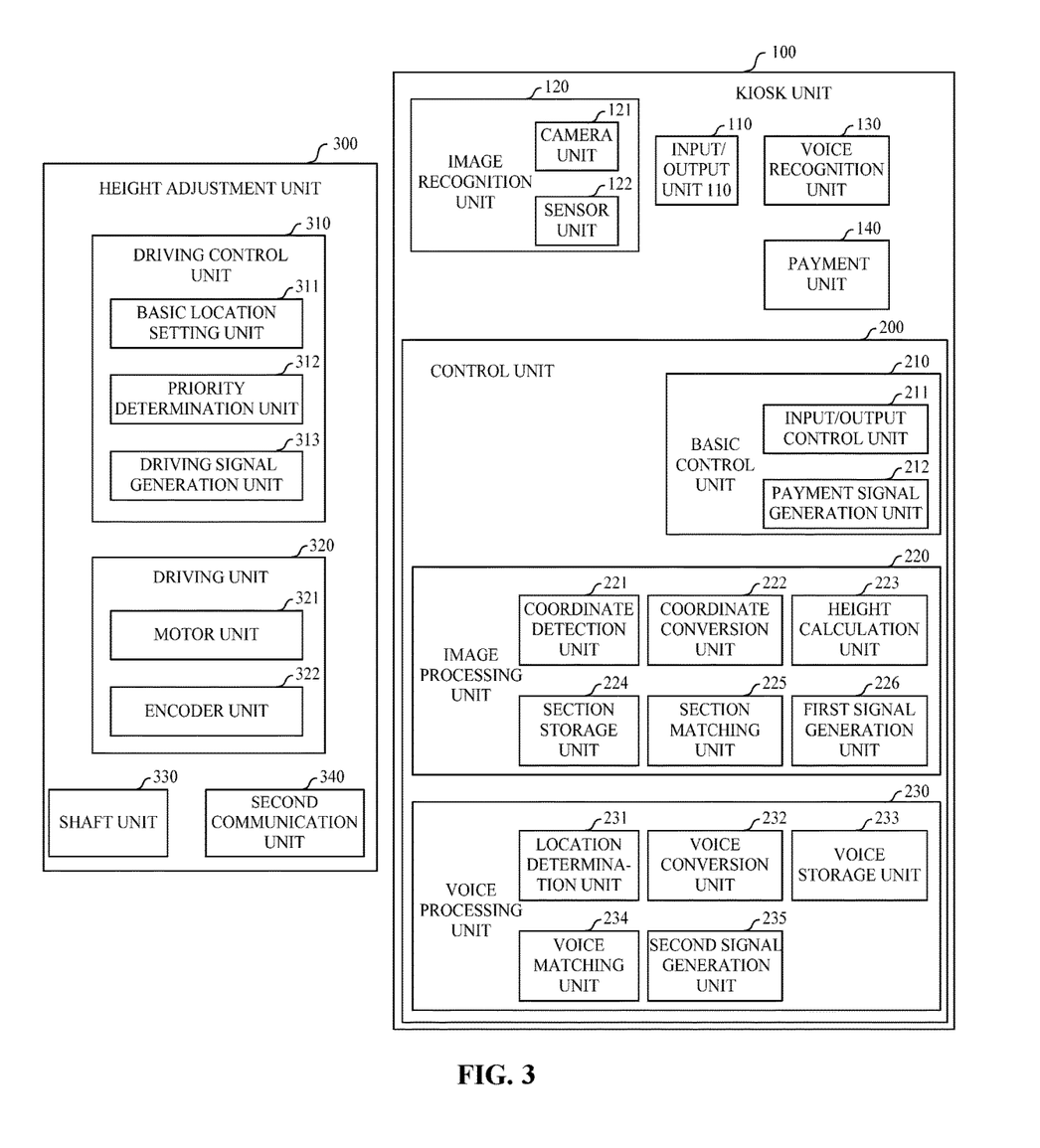
FIG. 3 is a block diagram of the height-adjustable kiosk apparatus according to the embodiment of the present disclosure.
Figure 4:
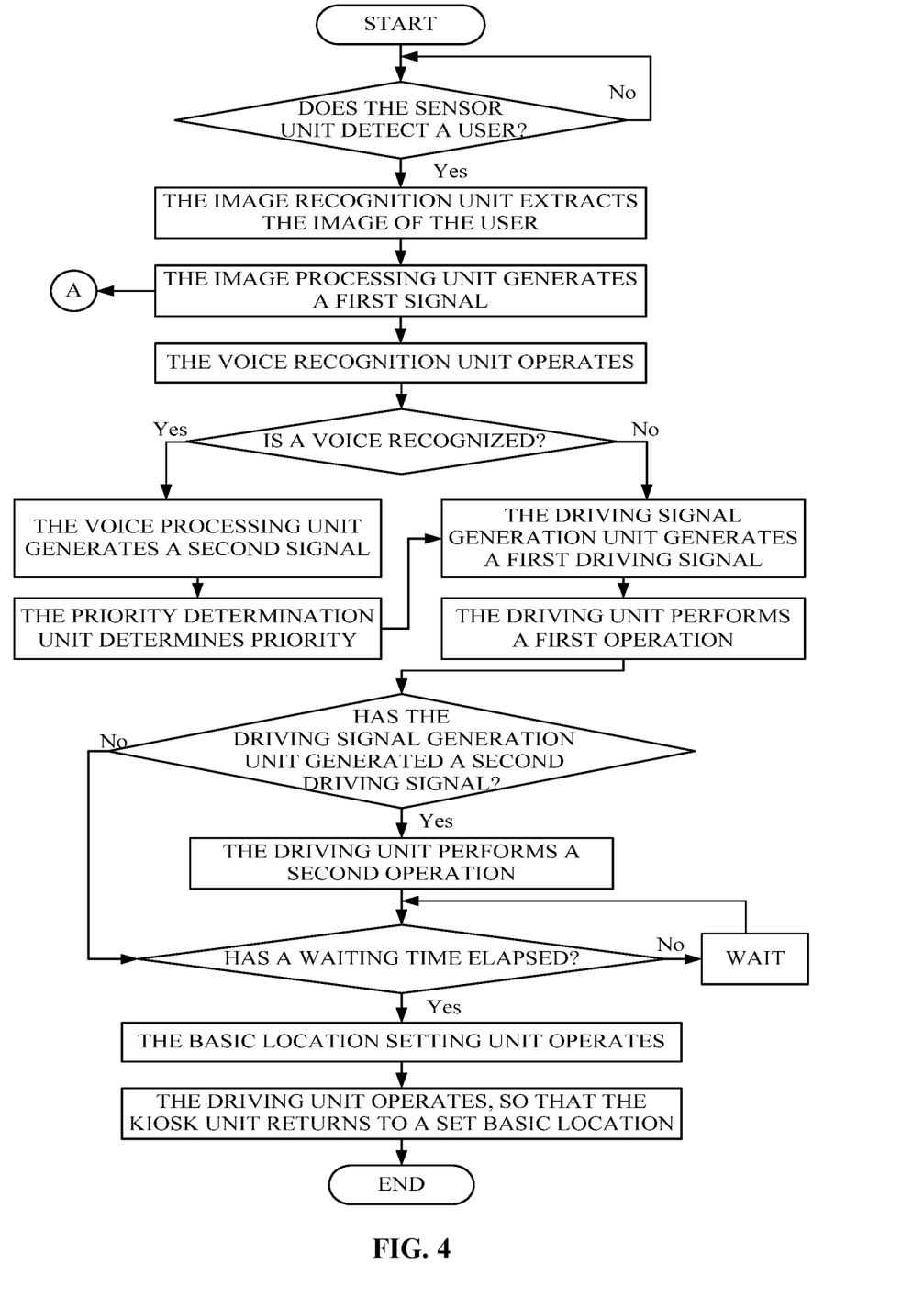
FIG. 4 is a flowchart showing the operation of the height-adjustable kiosk apparatus according to the embodiment of the present disclosure.
Figure 5:
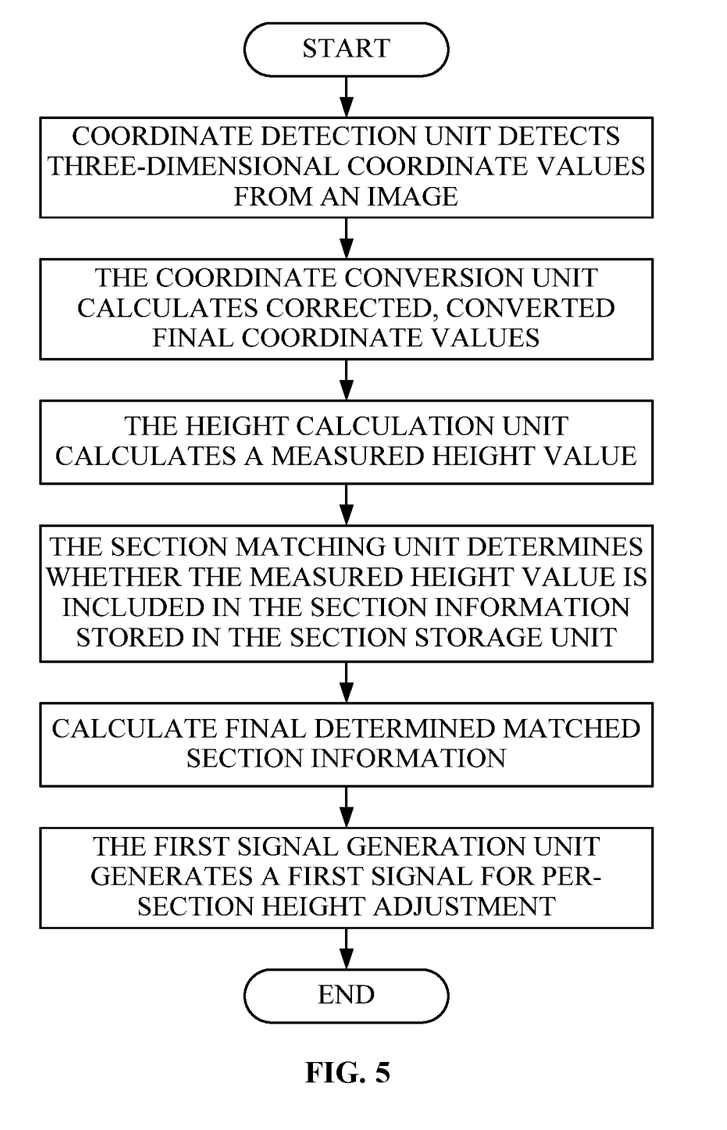
FIG. 5 is a flowchart showing the operation of an image processing unit in the height-adjustable kiosk apparatus according to the embodiment of the present disclosure.
Figure 6:
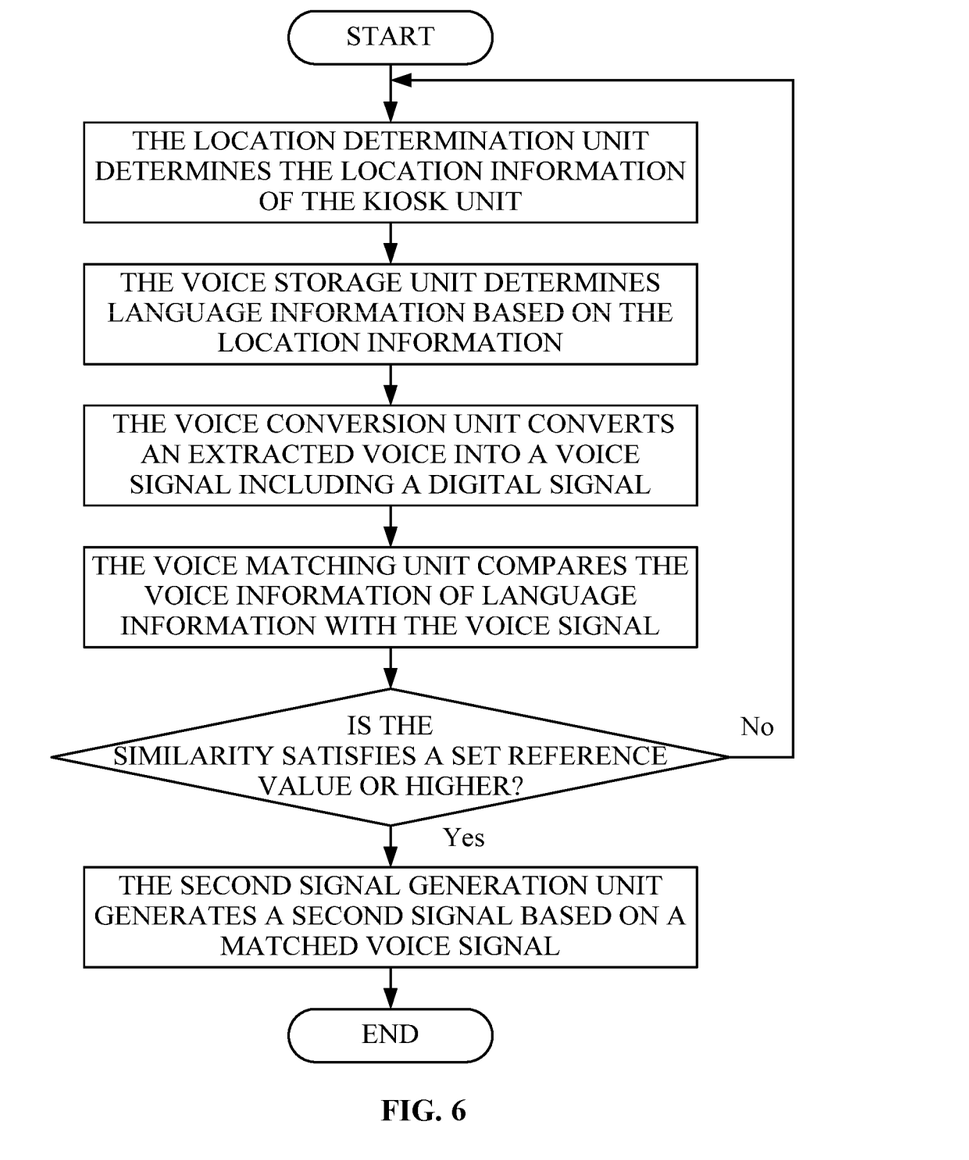
FIG. 6 is a flowchart showing the operation of a voice processing unit in the height-adjustable kiosk apparatus according to the embodiment of the present disclosure.

An object of the present disclosure is to provide height adjustment based on the level of a user's eyes. FIG. 1 is a comparative perspective view of an operating state of a height-adjustable kiosk apparatus according to an embodiment of the present disclosure, FIG. 2 is a view showing the configuration of the height-adjustable kiosk apparatus according to the embodiment of the present disclosure, FIG. 3 is a block diagram of the height-adjustable kiosk apparatus according to the embodiment of the present disclosure, FIG. 4 is a flowchart showing the operation of the height-adjustable kiosk apparatus according to the embodiment of the present disclosure, FIG. 5 is a flowchart showing the operation of an image processing unit in the height-adjustable kiosk apparatus according to the embodiment of the present disclosure, and FIG. 6 is a flowchart showing the operation of a voice processing unit in the height-adjustable kiosk apparatus according to the embodiment of the present disclosure.

Referring to FIGS. 1 to 6, a kiosk apparatus according to an embodiment of the present disclosure may include: a kiosk unit 100 configured to perform the original operation of a kiosk by recognizing an image and a sound, receiving signals from a user, performing output, and also processing payment, and to generate signals by processing the image and the sound; and a height adjustment unit 300 disposed under the kiosk unit 100 and configured to be operated to move up and down to adjust the height of the kiosk apparatus based on the signals generated by the kiosk unit 100.

The kiosk unit 100 may include: an input/output unit 110 configured to receive an input signal from a user and to output a notification signal to the outside; a payment unit 140 configured to process payment for a product or service for sale according to a signal input from the input/output unit 110; an image recognition unit 120 configured to determine whether to approach a user, and to extract the user's image; a voice recognition unit 130 configured to operate after the image recognition unit 120 has operated, and to extract the user's voice; a control unit 200 configured to control individual components of the kiosk apparatus, and to control the height adjustment unit 300 based on the image extracted by the image recognition unit 120 and the voice extracted by the voice recognition unit 130; and a first communication unit 150 configured to transmit and receive signals to and from the height adjustment unit 300. The individual components of the kiosk unit 100 will be described in detail below.

The input/output unit 110 is a means for receiving signals from a purchaser or outputting various types of information to the outside. Although the input/output unit 110 is described as one component herein, it should be noted that the present disclosure is not limited thereto, but an input unit and an output unit may be constructed separately by taking into consideration the process of manufacturing a product.

In addition, the input/output unit 110 may output guidance information for the adjustment of a height to the outside. In detail, when a driving signal for operation is generated and the height adjustment unit 300 operates, the control unit 200 may output a currently adjusted height section to the outside by receiving a first driving signal through the first communication unit 150 and then controlling the input/output unit 110 in a corresponding operation process. As an example of the output, information about a state in which the height of the kiosk apparatus is being adjusted may be output to the outside by outputting a measured height obtained by measuring the user's height and a section matching the measured height to the outside.

The image recognition unit 120 is a means disposed on the front of the kiosk unit 100 and configured to detect a user in front of the input/output unit 110 and to allow the image processing unit 220 of the control unit 200, which will be described later, to extract the detected user's image in order to generate a first signal. In detail, the image recognition unit 120 may include the sensor unit 122 disposed on the front of the kiosk and configured to check whether the user has been detected for a set time or longer, and a camera unit 121 configured to operate when the user is detected by the sensor unit 122 and then take and store the user's image. In this case, when the detection of the user is not determined by the sensor unit 122, the camera unit 121 does not operate, so that the camera unit 121 does not take an image of each user who simply walks near the apparatus, thereby reducing power consumption. Furthermore, no operation load is applied to the camera unit 121, so that the frequency of occurrence of device errors is reduced.

In addition, a configuration may be made such that the sensor unit 122 operates only when the operation of the image recognition unit 120 is primarily performed and the voice recognition unit 130 to be described later operates only when the operation of the image recognition unit 120 is completed. Accordingly, a separate sensor configuration is not added to the voice recognition unit 130 but is included in the image recognition unit 120 and operates, thereby simplifying the configuration of a product.

The voice recognition unit 130 is disposed on the front side of the kiosk unit 100, and may extract the user's voice when the user is detected and also the user's image is extracted by the image recognition unit 120. In detail, after the user's image has been extracted by the image recognition unit 120, the voice recognition unit 130 may operate and extract the user's voice. The voice recognition unit 130 may be operated in connection with the operation of the image recognition unit 120 without a separate sensor unit, thereby providing the effect of reducing the number of components used in the manufacture of a product. In addition, since the voice recognition unit 130 operates only when the image recognition unit 120 has operated, there is an effect in that the voice recognition unit 130 does not respond to external noise or a separate voice.

However, there is a case where the voice recognition unit 130 is operated according to an exceptional operation flow that is separately performed without being connected with the operation of the image recognition unit 120 for the purpose of management. This operation may exceptionally be performed first only when the basic control unit 210 of the control unit 200 desires to use the height adjustment of the kiosk only with an extracted voice in response to the failure of the image recognition unit 120 or the user's circumstances.

The payment unit 140 is a means for recognizing the user's payment method and performing payment when the user selects a desired product or service through the input/output unit 110. Since the configuration of the payment unit 140 is a configuration commonly used in kiosks, a detailed description thereof will be omitted.

The control unit 200 is a means capable of controlling the operation of the kiosk unit 100 and also generating signals based on an image and a voice extracted by the image recognition unit 120 and the voice recognition unit 130, respectively. In detail, the control unit 200 may include: a basic control unit 210 configured to control input/output and a payment operation, which are basic operations of the kiosk unit 100; an image processing unit 220 configured to generate a first signal, which is a setting signal based on the height adjustment section, based on the image extracted by the image recognition unit 120; and a voice processing unit 230 configured to generate a second signal, which is a setting signal for fine height adjustment, based on the voice extracted by the voice recognition unit 130.

The basic control unit 210 is a component configured to control the general operation of the kiosk unit 100, and is a means for controlling the input/output unit 110 and the payment unit 140. In detail, the basic control unit 210 may include: an input/output control unit 220 configured to control the input/output unit 110 so that an input signal is input from the user or information related to the kiosk unit 100 and the height adjustment unit 300, i.e., information about the height section, is output to the outside; and a payment signal generation unit configured to control the operation of the payment unit 140 so that the user's payment method is recognized and a payment signal is generated to enable payment.

In addition, in principle, the basic control unit 210 controls the kiosk unit 100 so that the voice processing unit 230 operates after the image processing unit 220 has operated. Furthermore, the basic control unit 210 may control the kiosk unit 100 so that, when the failure of the image processing unit 220 occurs or a manager temporarily stops the operation of the image processing unit 220 through settings, the voice processing unit 230 continuously operates regardless of whether the image processing unit 220 operates.

The image processing unit 220 is a means capable of generating a first signal by calculating a height from an image extracted by the image recognition unit 120 and matching the calculated height with a predetermined section. In detail, the image processing unit 220 includes: a coordinate detection unit 221 configured to detect three-dimensional coordinates for the center of both eyes of the user from an image extracted by the image recognition unit 120; a coordinate conversion unit 222 for converting coordinates, detected by the coordinate detection unit 221, into physical coordinate values and correcting them; a height calculation unit 223 configured to calculate a measured height value based on the converted and corrected final coordinate values; a section storage unit 224 configured to store a plurality of section values for respective predetermined height sections; a section matching unit 225 configured to match the measured height value with a section value when the measured height value calculated by the height calculation section 223 is included in the corresponding section value; and a first signal generation unit 226 configured to generate a first signal including a height value corresponding to the final section value.

The coordinate detection unit 221 is a means for detecting an image from an image extracted by the image recognition unit 120, detecting the locations of both eyes of the user based on the detected image, and detecting three-dimensional coordinates based on the locations. In detail, the three-dimensional coordinates detected in this case may include the center values of both eyes of the user, and may primarily detect coordinate values for the measurement of the height of the user's eyes through them.

The coordinate conversion unit 222 is a means for generating final coordinate values by converting three-dimensional coordinate values, extracted by the coordinate detection unit 221, into physical coordinate values and then correcting them. In detail, in order to calculate a measured height value in the height calculation unit 223, physical coordinate values are essentially required. The coordinate conversion unit 222 may correct coordinate values, measured in an image, based on the installation height information, installation angle information, focus information, photographing direction information, and disposition location information of the camera unit 121, and may convert them into physical coordinate values. Although it is common to convert three-dimensional coordinates, detected by the coordinate detection unit 221, into simple physical coordinate values, an effect in which an error value between a measured height value and an actual height value can be drastically reduced may be achieved by calculating final coordinate values calculated according to the focus, photographing direction and disposition location information of the camera unit 121 through the coordinate conversion unit 222.

The height calculation unit 223 may calculate a measured height value based on the final coordinate values converted and corrected by the coordinate conversion unit 222. In this case, the measured height value may be calculated by calculating floor values, photographed by the camera unit 121, as a reference for a zero point, and a final measured height value may be calculated by comparing the final coordinate values with the floor values photographed by the camera unit 121.

The section storage unit 224 is a means for storing a plurality of pieces of section information for the matching of a measured height value calculated by the height calculation unit 223. In detail, the plurality of pieces of section information is a means for setting a plurality of sections in the state in which height values corresponding to a total setting range are limited by the minimum and maximum values thereof and storing the plurality of set sections. For example, the lower and upper limits of the plurality of pieces of section information may be limited to 100 cm and 200 cm, respectively, and the section of 100 to 120 cm, the section of 120 to 140 cm, the section of 140 to 160 cm, the section of 160 to 180 cm, and the section of 180 to 200 cm may be set to first, second, third, fourth and fifth sections, respectively, based on the setting range of 20 cm. However, this is merely an example and is not limited thereto. It is noted that, when division is made into a plurality of sections based on the height value of the setting range, the ranges of the values are variable.

The section matching unit 225 is a means for matching a measured height value with section information by comparing and matching the measured height value, calculated by the height calculation unit 223, against the plurality of pieces of section information stored in the section storage unit 224. In detail, the section matching unit 225 may determine which one of the plurality of pieces of section information includes the measured height value, i.e., one singular value, and may determine the included section information to be matched section information.

When the matched section information is determined through the section matching unit 225, the first signal generation unit 226 may generate a first signal corresponding to the determined matched section information. The first signal generation unit 226 generates a digital signal by converting the conventional matched section information into the digital signal, so that it can be used as a signal for height driving in the height adjustment unit 300 to be described later. In this case, the first signal may be understood as a basic signal for height adjustment for each section that is matched with a signal generated from an image.

In other words, the image processing unit 220 is a means capable of finally generating a first signal corresponding to the section information matching the height of the user by extracting coordinate values from an image based on the image taken by the image recognition unit 120, finally calculating a measured height value, and then determining matching section information in which the corresponding value is included through the comparison of the measured height value with previously stored section information.

The voice processing unit 230 is a means capable of generating a second signal by determining the location of the user, collecting and converting a voice extracted by the voice recognition unit 130, and then matching the converted voice with a stored voice. In detail, the voice processing unit 230 may include: a location determination unit 231 configured to determine the location information of the kiosk unit 100; a voice conversion unit 232 configured to convert a voice, extracted by the voice recognition unit 130, into a digital signal, i.e., a voice signal; a voice storage unit 233 configured to store language information that is set for a region determined by the location determination unit 231; a voice matching unit 234 configured to match the language information stored in the voice storage unit 233 with the voice signal converted by the voice conversion unit 232 by comparing the language information with the voice signal; and a second signal generation unit 235 configured to generate a second signal including an operation signal according to the matched language information when the voice signal and the language information are matched with each other by the voice matching unit 234.

The location determination unit 231 is a means for determining the location information of the kiosk unit 100 in order to determine a criterion for a voice to be processed by the voice processing unit 230. In detail, the location determination unit 231 is a means capable of first determining the location of the kiosk unit 100 in order to determine language information preset for each region stored in the voice storage unit 233 to be described later so that the kiosk apparatus is operated in the language of the region. For example, when it is determined that the kiosk unit 100 is located in an English-speaking country (such as the United States), the set language information may be determined to be English. In contrast, when it is determined that you are located in Korea, the set language information may be determined to be Korean. To this end, the position determination unit 231 may determine the location of the kiosk unit 100.

The voice conversion unit 232 is a means for converting a voice, extracted by the voice recognition unit 130, into a digital signal in order to generate a second signal. A voice extracted from the user through the voice conversion unit 232 may be converted into a text signal including a digital signal according to predetermined language conversion criteria. As an example of the conversion, a method of analyzing an extracted voice using SPEECH SDK and converting voice data into a text signal including a digital signal by using STT based on the results of the analysis may be utilized. In this case, a technology for converting a voice signal into a text signal including a digital signal is a known technology, and a detailed description thereof will be omitted.

The voice storage unit 233 is a means capable of storing preset language information. In detail, the voice storage unit 233 may store language information preset for each region by a manager, and the preset language information may include language information for three operations, i.e., up, down, and stop operations, for height adjustment. The preset language information may be stored as language information designated for each country, and preset voice information may be stored in the voice storage unit 233 to match a text signal obtained through conversion by the voice conversion unit 232. Furthermore, when final location information is determined by the location determination unit 231, language information corresponding to the location information may be determined.

The voice matching unit 234 is a means for matching the voice signal obtained through the conversion by the voice conversion unit 232 with the voice information stored in the voice storage unit 233, determining whether the similarity therebetween satisfies a set reference value or higher, and determining whether matching has been achieved based on the results of the above determination. When it is determined by the voice matching unit 234 that matching has been achieved because the similarity therebetween satisfies the set reference value or higher, the second signal generation unit 235 may generate a second signal. In contrast, when it is determined that matching has not been achieved because the similarity is smaller than the set reference value, the operation of the second signal generation unit 235 is not performed. It should be noted that when the operation of the second signal generation unit 235 is not performed, such a second signal is not generated.

The second signal generation unit 235 may generate a second signal for height driving for each piece of matched voice information. In this case, the second signal may be understood as a signal generated by a voice, i.e., a basic signal, for fine height adjustment.

The first communication unit 150 is a means capable of transmitting signals, generated by the kiosk unit 100, to the height adjustment unit 300 and conversely receiving signals from the height adjustment unit 300. In detail, the first communication unit 150 may transmit the first signal and the second signal to the height adjustment unit 300, and, conversely, receive the first driving signal and the second driving signal generated by the height adjustment unit 300 and transmit them to the control unit 200. In this case, the basic control unit 210 of the control unit 200 may output the operation information of the first driving signal and the second driving signal to the outside by controlling the input/output unit 110.

The height adjustment unit 300 is a means for receiving the first signal and the second signal generated by the kiosk unit 100, determining priority for height driving based on the first and second signals, and adjusting the height of the kiosk unit 100 according to a driving signal generated by the first signal and the second signal. In detail, the height adjustment unit 300 may include: a shaft unit 330 connected to the kiosk unit 100, and configured to provide a shaft for upward and downward movement; a driving unit 320 disposed between the shaft unit 330 and the kiosk unit 100, and configured to provide a driving force for the movement of the kiosk apparatus in the vertical extension direction of the shaft unit 330; a driving control unit 310 configured to control the operation of the driving unit 320; and a second communication unit 340 configured to transmit and receive signals to and from the kiosk unit 100.

The shaft unit 330 is a means for forming a space in which the driving control unit 310 and the second communication unit 340 are accommodated and also allowing the kiosk unit 100 to be mounted thereon. The shaft unit 330 may be a shaft formed to extend upward from the ground. Since this is a general configuration formed to dispose common kiosks, a detailed description thereof will be omitted.

The driving unit 320 is a means for providing a driving force that moves the kiosk unit 100 up and down by connecting the kiosk unit 100 and the shaft unit 330 to each other. In detail, the driving unit 320 may include: a motor unit 321 configured to be controlled by the drive control unit 310, and connected to the kiosk unit 100 to move gears up and down; a gear unit configured to be moved by the motor unit 321, and configured to move the kiosk unit 100 up and down; and an encoder unit 322 configured to adjust a vertical height error. However, the present disclosure is a disclosure for adjusting the height of the kiosk apparatus in a dual manner in order to adjust the error of height adjustment attributable to a mechanical configuration, rather than having a main feature in terms of the driving method. Accordingly, it should be noted that the driving unit 320 is not limited to the above case.

In addition, the driving unit 320 may be driven according to a first operation and a second operation in order to adjust the height of the kiosk unit 100. In this case, the first operation may be defined as an operation of, when the second communication unit 340 receives a first signal and the driving signal generation unit 313 generates a first driving signal, moving the kiosk apparatus by a height corresponding to determined matched section information, i.e., a height corresponding to a height section corresponding to the matched section information stored in the section storage unit 224. Furthermore, the second operation may be defined as an operation of, when the second communication unit 340 receives a second signal and the driving signal generation unit 313 generates a second driving signal, moving the kiosk apparatus by a height corresponding to a predetermined height section for each piece of voice information. The operation methods and examples of the first and second operations will be described later.

The second communication unit 340 is a means capable of transmitting and receiving signals to and from the kiosk unit 100. In detail, the second communication unit 340 may receive signals, generated by the control unit 200 of the kiosk unit 100, through the first communication unit 150 of the kiosk unit 100, and may also transmit signals, generated by the driving control unit 310, to the kiosk unit 100 through the first communication unit 150.

The driving control unit 310 is a means for receiving the first signal generated by the image processing unit 220 of the kiosk unit 100 and the second signal generated by the audio processing unit 230, generating driving signals, determining priority, and then setting a basic location. In detail, the driving control unit 310 may include: a basic location setting unit 311 configured to maintain the set height of the height adjustment unit 300 so that the kiosk unit 100 can be basically disposed at a set location; a priority determination unit 312 configured to determine the operational priority of the driving unit 320 by determining the priority between the signals transmitted from the kiosk unit 100; and a driving signal generation unit 313 configured to convert the first signal into a first driving signal and operate the driving unit 320 and to convert the second signal into a second driving signal and operate the driving unit 320.

The basic location setting unit 311 is a means for maintaining the height adjustment unit 300 at a set height so that the kiosk unit 100 can be disposed at a set location. In detail, set location information may be stored in the basic location setting unit 311. In this case, the set location information refers to the location range within which the camera unit 121 of the image recognition unit 120 can extract an image. In general, as the camera unit 121 of the image recognition unit 120 is located at the top or side end of the kiosk unit 100, the spatial range within which images are taken to measure the height of the user that can be photographed by the camera unit 121 is limited. When the height of the kiosk unit 100 is maintained in the state in which the height of the kiosk unit 100 has been adjusted by the user in the process of using the kiosk apparatus, there is a problem in that it is impossible to derive the first signal through an image of a subsequent user. To this end, when payment is completed in the basic control unit 210 of the control unit 200 or there has been no input signal input through the input/output unit 110 for a set time or longer, the driving unit 320 may be operated such that the kiosk unit 100 can be located at the set location information.

The driving signal generator 313 may generate driving signals based on signals received from the kiosk unit 100. In detail, the driving signal generation unit 313 may generate a first driving signal for the driving of the driving unit 320 according to the first operation when the second communication unit 340 receives the first signal. Furthermore, the driving signal generation unit 313 may generate a second driving signal for the driving of the driving unit 320 according to the second operation when the second communication unit 340 receives the second signal.

In this case, the first driving signal may be understood as a signal that enables the driving unit 320 to drive by a set section height matched in response to the first signal generated by determined matched section information determined in such a manner that a set section height is stored for each piece of section information. Furthermore, the second driving signal may be understood as a signal that enables the driving unit 320 to be driven according to a driving method set by a voice signal. For example, as for the section information, the set section height may be set to 110 cm for a first section, 130 cm for a second section, 150 cm for a third section, 170 cm for a fourth section, and 190 cm for a fifth section. As for the voice signals, in English-speaking countries, UP may be set to upward movement, DOWN to downward movement, and STOP to the stopping of driving.

The priority determination unit 312 is a means for determining priority for the operation of the driving unit 320 when the first and second signals are simultaneously transmitted from the first communication unit 150 of the kiosk unit 100. In detail, when the priority determination unit 312 is a means for allowing operations to be performed such that the first signal has priority over the second signal in the case of simultaneously receiving the first signal generated by the image processing unit 220 belonging to the control unit 200 of the kiosk unit 100 and the second signal generated by the audio processing unit 230, i.e., in the case where a signal based on the user's image processing and a signal based on voice processing are simultaneously generated by the kiosk unit 100.

The priority determination unit 312 will be described in detail below. In the case of the kiosk apparatus according to the present embodiment, after the image processing unit 220 of the control unit 200 has operated, the voice processing unit 230 operates. However, depending on the times at which the first signal and the second signal have been generated, the second communication unit 340 may receive the first signal and the second signal simultaneously or within a time range with an error smaller than a reference time. In this case, the priority determination unit 312 first transmits the first signal to the driving signal generator 313 so that the first signal has priority over the second signal, and may then transmit the second signal to the driving signal generation unit 313 after the first operation of the kiosk unit 100 has been completed. Through this operation, a case in which the first and second driving signals are simultaneously generated by the driving signal generation unit 313 is prevented from occurring. Accordingly, there is an effect in that a control conflict attributable to the simultaneous performance of the first and second operations of the driving unit 320 may be prevented.

Furthermore, when a plurality of second signals is transmitted, the priority determination unit 312 may determine priority based on the difference between the times at which the second signals has been introduced and transmit information about the priority to the driving signal generation unit 313. In detail, there is a problem in that since the second signals are generated by the voice conversion unit 232, operations need to be performed immediately according to the order of voice extraction. The priority determination unit 312 may transmit the second signals to the driving signal generation unit 313 according to a time difference corresponding to the difference between the times at which voice signals have been extracted, so that the second driving signals can be generated according to the time difference, and thus the second operations of the second driving unit 320 can be performed in a stepwise manner.

The operation of the kiosk apparatus according to the present disclosure will be described in detail.

Referring to FIG. 4, basically, the kiosk unit 100 of the kiosk apparatus may be maintained in the state of being disposed at a height corresponding to the set location information stored by the basic location setting unit 311 included in the driving control unit 310 of the height adjustment unit 300.

In this state, when the user moves to a location in front of the kiosk unit 100 to use the kiosk apparatus, the sensor unit 122 of the image recognition unit 120 determines that there is a user for a set time or longer and detects the user, and thus the camera unit may take an image of the user and extract the image.

When the user's image is extracted, the image processing unit 220 of the control unit 200 of the kiosk unit 100 may operate and generate a first signal.

Referring to FIG. 5, the coordinate detection unit 221 may detect coordinate values based on the image, extracted by the image recognition unit 120, to measure the height of the user's eyes, and the coordinate conversion unit 222 may correct the coordinate values based on the installation height, installation angle, and focus information of the camera unit 121 and convert the corrected coordinate values into physical coordinate values. Furthermore, the height calculation unit 223 may calculate a measured height value based on the final coordinate values corrected by the coordinate conversion unit 222, and the section matching unit 225 may determine section information, including the measured height value, to be the matching section information by comparing the plurality of pieces of section information stored in the section storage unit 224 with the measured height value and finally generate a first signal based on the determined matched section information.

For example, the lower and upper limits of the plurality of pieces of section information may be limited to 100 cm and 200 cm, respectively, and the section of 100 to 120 cm, the section of 120 to 140 cm, the section of 140 to 160 cm, the section of 160 to 180 cm, and the section of 180 to 200 cm may be set to first, second, third, fourth and fifth sections, respectively. When the measured height value calculated through the coordinate values of the height of the user's eyes is 170 cm, the determined matched section information may be determined to be the fourth section spanning from 160 to 180 cm.

When the first signal is generated, the first communication unit 150 may transmit the generated first signal through the second communication unit 340 of the height adjustment unit 300. In this case, when the height adjustment unit 300 receives the first signal, the driving signal generation unit 313 may generate a first driving signal. When the first driving signal is generated, the driving unit 320 may be driven according to a first operation. Accordingly, the height adjustment unit 300 may move the kiosk unit 100 by a set section height set in a height section corresponding to the primarily determined matched section information. For example, when the determined matched section information is determined to be the fourth section, the first driving signal may include a signal capable of driving the driving unit 320 of the height adjustment unit 300 so that the driving unit 320 moves to a height of 170 cm, which is a set section height set in the fourth section.

Thereafter, the user may secondarily adjust the height of the kiosk unit 100 through voice. In detail, the voice recognition unit 130 of the kiosk unit 100 may operate and extract the user's voice.

Referring to FIG. 6, the voice processing unit 230 of the control unit 200 of the kiosk unit 100 may determine an area by first determining the location of the kiosk apparatus through the location determination unit 231 and accordingly a language to be applied to the voice signal, and may determine whether the similarity satisfies a set reference value or higher by comparing the voice data stored in the voice storage unit 233 with the voice signal obtained through the conversion of the extracted voice by the voice conversion unit 232, and the second signal generation unit 235 may generate a second signal when it is determined that the similarity therebetween satisfies the set reference value or higher.

For example, when a corresponding region is determined to be the United States, i.e., an English-speaking country, a language to be applied to the region may be determined to be English. In the state in which the voice data of UP, DOWN, and STOP has been stored in the voice storage unit 233, when the voice signal extracted by the voice recognition unit 130 is determined to be a data signal obtained by converting an UP voice and matches the data signal, a second signal may be generated as a signal including an UP command.

When the second signal is generated, the first communication unit 150 may transmit the generated second signal through the second communication unit 340 of the height adjustment unit 300. In this case, when the height adjustment unit 300 receives the second signal, the driving signal generation unit 313 may generate a second driving signal. When the second driving signal is generated, the driving unit 320 may be driven according to a driving method set as the second operation, and the height adjustment unit 300 may perform secondary fine adjustment to a desired height. For example, when the second signal is generated as a signal including an UP command, the driving unit 320 may be driven to increase the height of the kiosk unit 100. In that state, when the second signal is generated as a signal including a STOP command, the operation of the driving unit 320 may be stopped so that the height adjustment of the kiosk unit 100 can be stopped.

In addition, since the priority determination unit 312 transmits the second signals to the driving signal generation unit 313 according to the time difference between the voice signals, the driving unit 320 may be driven according to second operations in a stepwise manner based on driving methods that are set for the second driving signals based on the time difference.

The height-adjustable kiosk configured as described above has the following effects:

First, the height of the kiosk apparatus is basically adjusted according to a user's body, so that there is an effect in that the kiosk apparatus may be efficiently utilized by tall to short persons, i.e., people ranging from general adults to children, and persons with a physical disability (e.g., wheelchair users).

Furthermore, the height of the kiosk apparatus is not simply uniformly adjusted to fit a user's body, but the height of the kiosk apparatus is primarily adjusted according to a height section calculated from the user's body through an image and, secondarily, fine adjustment to a height desired by the user may be performed through voice, so that there is an effect in that the kiosk apparatus may be adjusted in an individually suitable environment according to the structure of the user's body.

Furthermore, the kiosk unit 100 extracts both image and voice signals and generates signals, whereas the height adjustment unit 300 receives both the signals and operates by using a single component, so that a collision problem occurs between the signals. In order to solve this problem, through the priority determination unit 312, the first signal is transmitted to the driving signal generation unit in preference to the second signal, and also a plurality of second signals is transmitted to the driving signal generation unit 313 according to the difference between the times at which voice signals have been extracted in order to distinguish the plurality of second signals. Accordingly, there is an effect in that the problem of signal collision is solved.

Furthermore, when a payment through the kiosk apparatus is made or there is no input from the input/output unit 110 for a set time or longer in the state in which the height of the kiosk unit 100 has been adjusted, the driving unit 320 is driven such that the kiosk unit 100 returns to a reference height set by the set location information. Accordingly, there is an effect in that a user's face may be stably photographed regardless of the photographing angle or installation location of the camera unit 121.

Moreover, in the case of voice signals, even when a plurality of voice signals is extracted, the driving unit 320 performs driving according to the second operation in a stepwise manner based on an extracted time difference. Accordingly, there is an effect in that the operation of the driving unit 320 is successively performed without collision between signals even when voice signals are successively input.

The present disclosure has been described so far with a focus on the preferred embodiments. It will be understood by those of ordinary skill in the art to which the present disclosure pertains that the present disclosure may be implemented in a modified form without departing from the essential characteristics of the present disclosure. Therefore, the disclosed embodiments should be taken into consideration in an illustrative sense rather than a restrictive sense. The scope of the present disclosure is defined based on the attached claims rather than the foregoing detailed description, and all differences falling within the scopes equivalent to the claims should be construed as being included in the present disclosure.

What is claimed is:

1. A height-adjustable kiosk apparatus, comprising:
a kiosk unit configured to generate processed signals by recognizing and processing an image and a voice, to receive basic signals from a user, to perform output, and to process payment; and
a height adjustment unit disposed under the kiosk unit, and equipped with a driving unit configured to be driven to move the kiosk unit up and down based on the processed signals;
wherein the kiosk unit comprises:
an image recognition unit configured to detect a user and to extract an image of the user;
a voice recognition unit configured to extract a voice of the user;
an image processing unit configured to calculate a measured height value by converting the image extracted by the image recognition unit, to determine a determined matched section by comparing previously stored section values with the measured height value, and to calculate a first signal; and
a voice processing unit configured to convert the voice, extracted by the voice recognition unit, into a voice signal, to match the voice signal with a previously stored voice, and to calculate a second signal when a similarity between the voice signal and the stored voice satisfies a set reference value or higher; and
wherein the height adjustment unit comprises:
a driving signal generation unit configured to, when the first signal is calculated, calculate a first driving signal used for the driving unit to drive the kiosk unit to a height value set for the determined matched section, and to, when the second signal is calculated, calculate a second driving signal used for the driving unit to drive the kiosk unit according to an operation set in the voice signal; and
a priority determination unit configured to, when the driving signal generation unit receives the first signal and the second signal, perform control so that the first driving signal is preferentially generated for the first signal.

2. The height-adjustable kiosk apparatus of claim 1, wherein the image processing unit comprises:
a coordinate detection unit configured to detect three-dimensional coordinates for a center of both eyes of the user from the image extracted by the image recognition unit;
a coordinate conversion unit configured to determine final coordinate values by converting the coordinates, detected by the coordinate detection unit, into physical coordinate values and then correcting the physical coordinate values;
a height calculation unit configured to calculate the measured height value based on the final coordinate values;
a section storage unit configured to store a plurality of section values for respective predetermined height sections;
a section matching unit configured to determine a determined matched section when the measured height value is included in a corresponding one of the section values; and
a first signal generation unit configured to calculate the first signal including a height value of the determined matched section.

3. The height-adjustable kiosk apparatus of claim 2, wherein the height adjustment unit further comprises a priority determination unit configured to, when the first signal and the second signal are simultaneously received, determine priority so that the first driving signal can be generated in preference to the second driving signal by transmitting the first signal to the driving signal generation unit in preference to the second signal.

4. The height-adjustable kiosk apparatus of claim 3, wherein the kiosk unit further comprises an input/output unit configured to output an operating state to an outside when the driving unit performs one of the first and second operations.

5. The height-adjustable kiosk apparatus of claim 2, wherein the kiosk unit further comprises an input/output unit configured to output an operating state to an outside when the driving unit performs one of the first and second operations.

6. The height-adjustable kiosk apparatus of claim 1, wherein the voice processing unit comprises:
a location determination unit configured to determine location information of the kiosk unit;
a voice conversion unit configured to convert the voice, extracted by the voice recognition unit, into the voice signal including a digital signal;
a voice storage unit configured to store language information set for each region determined by the location determination unit;
a voice matching unit configured to compare the language information stored in the voice storage unit with the voice signal obtained through the conversion by the voice conversion unit, and to perform matching when a similarity therebetween satisfies the set reference value or higher; and
a second signal generation unit configured to, when the voice signal and the language information are matched with each other, generate the second signal including an operation signal according to the matched language information.

7. The height-adjustable kiosk apparatus of claim 6, wherein the height adjustment unit further comprises a priority determination unit configured to, when the first signal and the second signal are simultaneously received, determine priority so that the first driving signal can be generated in preference to the second driving signal by transmitting the first signal to the driving signal generation unit in preference to the second signal.

8. The height-adjustable kiosk apparatus of claim 7, wherein the kiosk unit further comprises an input/output unit configured to output an operating state to an outside when the driving unit performs one of the first and second operations.

9. The height-adjustable kiosk apparatus of claim 6, wherein the kiosk unit further comprises an input/output unit configured to output an operating state to an outside when the driving unit performs one of the first and second operations.

10. The height-adjustable kiosk apparatus of claim 1, wherein the height adjustment unit further comprises a priority determination unit configured to, when the first signal and the second signal are simultaneously received, determine priority so that the first driving signal can be generated in preference to the second driving signal by transmitting the first signal to the driving signal generation unit in preference to the second signal.

11. The height-adjustable kiosk apparatus of claim 10, wherein the kiosk unit further comprises an input/output unit configured to output an operating state to an outside when the driving unit performs one of the first and second operations.

12. The height-adjustable kiosk apparatus of claim 1, wherein the kiosk unit further comprises an input/output unit configured to output an operating state to an outside when the driving unit performs one of the first and second operations.

\* \* \* \* \*